April 26, 1932.   C. H. HAGSTEDT   1,855,447
COUPLING FOR OUTLET BOXES
Filed Jan. 17, 1929
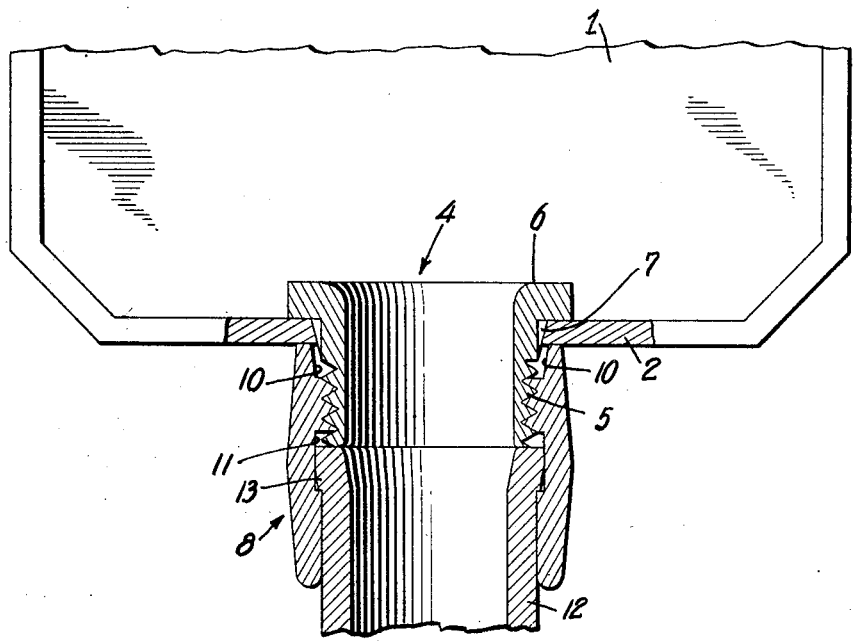
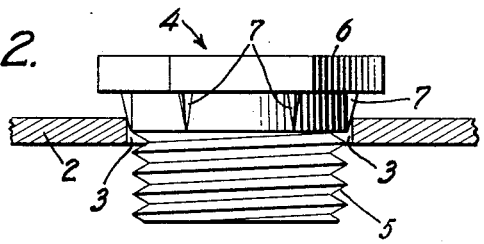
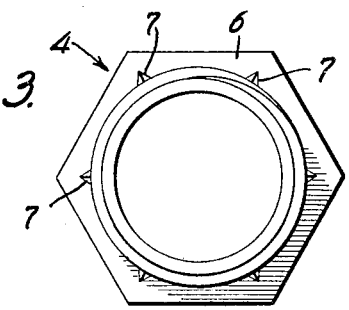
INVENTOR
Charles H. Hagstedt.
BY
Moses & Nolte
ATTORNEY Patented Apr. 26, 1932

1,855,447

UNITED STATES PATENT OFFICE

CHARLES H. HAGSTEDT, OF VALLEY STREAM, NEW YORK

COUPLING FOR OUTLET BOXES

Application filed January 17, 1929. Serial No. 333,078.

This invention relates to couplings for conduit outlet boxes, and has for its principal object the provision of improved means for connecting the conduit to the box with a minimum of parts and labor.

Another object is the provision of means for insuring convenient insertion of the electrical conductor from the box to the conduit.

Applicant's United States application Serial No. 104,006, for electrical conduit couplings, filed April 23, 1926, now Patent No. 1,697,815, discloses an improved form of coupling for electrical conduit pipes; and his application Serial No. 257,130, for electrical conduit coupling, filed February 27, 1928, discloses a modified and improved form of such coupling. The present invention discloses a further modified and improved form of such coupling and an improved type of bushing adapted to cooperate with such coupling and with other couplings. In accordance with the present invention, a connection may be made between the conduit box and the conduit pipe which is of adequate strength, which provides a good electrical contact between the box and the pipe, and wherein the rotatable member of such connection is located outside the box and is so constructed and arranged that it may be turned without loosening the connected joint of the pipe.

In the previous applications hereinbefore referred to, there are disclosed couplings adapted to connect lengths of conduit pipe in such a manner as to insure that their ends shall abut, and that such ends shall be smooth and free from burrs, in order to permit of the free passage of the steel cable or "snake" by which the electrical conductor is thereafter drawn through the conduit, and to obviate the possibility of damaging the conductor insulation.

In accordance with the present invention there is provided a coupling generally similar to those disclosed in the previous applications for use in connection with conduit pipes, with all the advantages incident thereto, and also a special type of bushing co-operative therewith for effecting a connection between the conduit pipe and the conduit box, whereby such a connection may be formed which is adequately strong, and the necessity is eliminated for reaming and threading a cut end of the conduit pipe which it is desired to connect to the box.

The invention will best be understood by reference to the accompanying drawings, wherein is shown the present preferred embodiment thereof, and in which Fig. 1 is a fragmentary front elevation, partly in section, of a conduit box and a conduit pipe with pipe fittings between said box and pipe, the pipe and the pipe fittings being shown in section.

Fig. 2 is a side elevation of a bushing forming one of the fittings shown in section in Fig. 1, said bushing being illustrated in the position which it initially occupies with relation to the outlet of the conduit box, the wall of the conduit box being shown in section.

Fig. 3 is a bottom plan view of the bushing shown in section in Fig. 1 and also shown in elevation in Fig. 2.

Referring to the drawings, 1 indicates an outlet box, which may be of any conventional form, and in one wall 2 of which box is an aperture 3 (Fig. 2) for receiving a bushing 4, provided with external screw threads 5, a hexagonal or other polygonal head 6, and a plurality of wedge-shaped projections, such as 7.

Coupling 8 is provided at one end with an annular recess 10, and is also provided with an inner annular recess 11.

The invention is intended for use in connection with a conduit pipe 12, which has been cut to length, and the cut end of which pipe has been inserted in the coupling 8 and expanded into the recess 11 by means of a tapered punch, in the manner illustrated and described in the previous applications hereinbefore referred to. Such expansion eliminates the burr resulting from the cutting of the pipe and chamfers the pipe end to insure free passage of the "snake" and the electrical conductor. The expanding operation provides on the end portion of the pipe 12 within the coupling 8 an external collar 13 which extends the full length of the recess 11. The connection formed between the coupling 8 and the pipe 12 is a union connection, that is to say, the coupling may be rotated relative to the pipe section.

In securing the pipe and its attached coupling to the outlet box, the coupling is first placed in abutting relation with the box, and the bushing is placed in the box by hand, inserted outward through the aperture 3 in the box wall 2, and threaded with the fingers into the coupling 8 until rotation of the bushing is arrested by engagement of the projections 7 with the wall 2. The mechanic then applies a pipe wrench to the coupling and turns the coupling until the coupling and the bushing are drawn into firm gripping engagement with the box wall 2. During such rotation of the coupling by the wrench, the bushing is held against rotation by engagement of the projections 7 with the boundary wall of the aperture 3. As the screwing of the coupling onto the bushing progresses, these projections bite into the wall 2 of the outlet box, so that they not only hold the bushing firmly against rotation, but at the conclusion of the operation contribute substantially to the making of a good electrical connection between the bushing and the outlet box.

Owing to variation in the wall thicknesses of different outlet boxes, it is not possible to foretell how far into the coupling the bushing will have to project in order to bring about the desired firm gripping relation of the coupling and bushing with the wall 2 of the outlet box. In order to provide a practicable construction in which such gripping shall be secured and in which firm butting engagement of the end faces of the bushing 6 and of the pipe 12 shall also be assured, the parts are so designed that the end face of the bushing will invariably engage the end face of the pipe 12 before relative rotation of the bushing and the coupling is positively arrested by the wall 2. The recess 11 is made shallow enough so that when the force of a pipe wrench is applied to the coupling and acts through the mechanical advantage given by the bushing and coupling threads, the expanded end portion of the pipe 12 may give and may be moved longitudinally in the coupling.

Since this gives rise to some uncertainty as to the length of the external collar 13 which will remain on the end of the pipe 12 after the connection to the outlet box has been effected, the recess 11 which determines the initial length of the collar, is made of greater length than would be necessary to provide a collar of just the length to have the required strength and permanence in use. The length of the recess desirably exceeds the required length of collar by at least the maximum variation in the thickness of outlet box walls encountered in practice.

The projections 7 are designed to be approximately as long as the maximum thickness of outlet box walls likely to be encountered. In case a particularly outlet box wall is of less than the maximum thickness, however, these projections will extend through the wall and project into the coupling. The recess 10 at the upper end of the coupling is accordingly provided in order that the coupling may receive these projections without engaging them.

The cylindrical wall of the recess comes so close to the projections, however, that the metal of the box wall which is pushed by the projections beyond the box wall and into the recess are caused to be squeezed tight between the projections and the recess wall. In the final turning of the coupling the pressure and friction upon these small bodies of projecting metal are so great that the projecting metal (which is integral with the box) is caused to become permanently united with the metal of the coupling and the bushing, the high temperature and pressure involved resulting in a sort of welding action. Owing to this characteristic of the connection formed, there is no liability of accidental backing off of the coupling from the bushing, no matter how long the structure remains in use. The securement of a good permanent electrical connection is, therefore, assured.

It will be seen that with the construction as described a connection of good mechanical strength and electrical conductance is provided. The outlet box wall is in conductive engagement with the surfaces of the flange 6 and coupling 8 which grip it, and is in especially good electrical contact with the projections 7 of the bushing. The threads of the bushing 4 and of the coupling 8 are pressed firmly against one another, while the end faces of the bushing 4 and of the pipe section 12 are pressed firmly together, and the collar 13 of the pipe 12 is pressed firmly against the shoulder at the lower end of the coupling recess 11.

The connection involves few and simple parts, and may be effected reliably and with a minimum consumption of the mechanic's time.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

I claim:

1. In combination, an electrical outlet box having an aperture in a wall thereof, a flanged threaded bushing constructed and arranged to be received in the wall aperture from within the box and provided on its periphery with longitudinally extending, tapering, blade-like projections adapted to bite into the boundary wall of the aperture and prevent rotation of the bushing, a pipe section, and a coupling in which an end of the pipe section is anchored with capacity for rotation, said coupling being threadable onto the bushing, and cooperative therewith to grip the outlet box wall.

2. In combination, an electrical outlet box having an aperture in a wall thereof, a flanged bushing insertable in the aperture from within the box, peripheral projections on the bushing adapted to bite into the boundary wall of the aperture and hold the bushing against rotation, a coupling threadable onto the bushing and having a long, shallow recess intermediate its ends, a pipe section having its end portion expanded in the recess to form a union connection with the coupling, the coupling recess being shallow enough to limit expansion of the pipe section with an end face thereof projecting inward in position to abut the bushing, and being long enough so that the pipe section may be forced longitudinally of the coupling by the bushing until the box wall is firmly gripped between the coupling and the bushing flange and still leave on the pipe end an expanded portion of sufficient length to provide the necessary strength and permanence of the pipe and coupling connection.

3. In combination, an electrical outlet box having an aperture in a wall thereof, a flanged, threaded bushing insertable in the aperture from within the box, tapering, blade-like projections on the periphery of the bushing adapted to bite into the boundary wall of the aperture and hold the bushing against rotation, a coupling threadable onto the bushing, the coupling having an internal recess at the end thereof adjacent the outlet box so that the bushing projections, if longer than the thickness of the box wall, may project through into the bushing without engaging it and interfering with the relative rotation of the coupling and the bushing.

4. The combination of a box wall provided with an aperture, an externally threaded bushing adapted to be seated in said aperture, means on said bushing for scarifying the wall surface defining the aperture, a flanged head on said bushing adapted to contact with the inner wall surface adjacent the aperture, a pipe, and a coupling provided with a recess in which an end of said pipe is expansively anchored with capacity for rotation relative to the coupling, said coupling being provided with internal screw threads cooperative with the external screw threads of said bushing whereby rotation of the coupling draws the bushing into the aperture, scarifies the wall surface defining the aperture, grips the wall surface adjacent the aperture between the surface of the flanged head of the bushing and the end of the coupling, and forces the upset end of the pipe to a firm seat on a shoulder forming one wall of the coupling recess.

5. In combination, a conduit box, a screw-threaded bushing element constructed and arranged to be inserted from within the box in an aperture formed in a wall of said box, projections on said bushing for biting into the box wall, a flanged head on said bushing for operatively contacting with the inner wall surface adjacent the aperture, a pipe, a coupling element provided with a recess in which said pipe is expansively anchored with provision for rotation, and also provided with threads cooperative with the threads of the bushing element to cause the projections to bite into the wall surface defining the aperture in order to effect an electrical contact between said conduit box and said bushing and hold the bushing against rotation, to press the expanded portion of said pipe against one of the surfaces defining the coupling recess, and to grip between the flanged head of the bushing and the end of the coupling the wall surface adjacent the aperture.

6. In combination, an electrical junction box having an opening through a wall thereof, a threaded bushing adapted to be inserted through the wall and having blade-like projections located upon its periphery for biting into and deforming the metal of said wall, and a coupling adapted to be threaded onto the bushing and to cooperate with the bushing in gripping the wall, said coupling having a recess in the end thereof adapted to receive the projections of the bushing, and said recess having a wall cooperative with the bushing projections to squeeze into permananent union with the bushing and the coupling, the metal of the box wall which is forced outward with reference to the box wall by the bushing projections.

In testimony whereof I have affixed my signature to this specification.

CHARLES H. HAGSTEDT.